(12) United States Patent
Koss

(10) Patent No.: US 6,921,034 B2
(45) Date of Patent: Jul. 26, 2005

(54) FUEL NOZZLE ASSEMBLY

(75) Inventor: Christopher R. Koss, West Chester, OH (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 10/317,723

(22) Filed: Dec. 12, 2002

(65) Prior Publication Data

US 2004/0124273 A1 Jul. 1, 2004

(51) Int. Cl.$^7$ .................... F02M 59/00; F02M 39/00; B05B 1/30
(52) U.S. Cl. ............... 239/533.2; 239/533.3; 239/585.1; 239/585.5; 239/600; 239/601
(58) Field of Search ............ 239/533.2, 533.3, 239/533.11, 600, 601, 585.1–585.5, 88–93; 251/129.15, 129.21, 127; 60/737, 742, 740, 739

(56) References Cited

U.S. PATENT DOCUMENTS

| | | | |
|---|---|---|---|
| 4,925,112 A | * | 5/1990 | Wahba ...................... 239/409 |
| 4,958,598 A | * | 9/1990 | Fosseen ...................... 123/1 A |
| 5,004,162 A | * | 4/1991 | Stettner et al. .......... 239/585.1 |
| 5,146,741 A | | 9/1992 | Sood |
| 5,146,904 A | * | 9/1992 | Olson et al. ............... 123/533 |
| 5,243,816 A | | 9/1993 | Huddas |
| 5,406,798 A | | 4/1995 | Wiesner, Jr. |
| 5,417,054 A | | 5/1995 | Lee et al. |
| 5,423,173 A | | 6/1995 | Lemon et al. |
| 5,735,117 A | | 4/1998 | Toelle |
| 5,881,550 A | | 3/1999 | Toelle |
| 5,988,531 A | | 11/1999 | Maden et al. |
| 6,082,113 A | | 7/2000 | Prociw et al. |
| 6,351,948 B1 | | 3/2002 | Goeddeke |
| 6,354,085 B1 | | 3/2002 | Howell et al. |
| 6,357,237 B1 | | 3/2002 | Candy et al. |

* cited by examiner

*Primary Examiner*—Davis Hwu
(74) *Attorney, Agent, or Firm*—V. G. Ramaswamy; Sonnenschein Nath & Rosenthal LLP

(57) ABSTRACT

A fuel nozzle assembly for delivering fuel to a combustor of a gas turbine engine. The assembly includes a fuel nozzle including a body having a fuel inlet, an air inlet, an outlet for discharging fuel to the combustor, and a mounting flange for mounting the nozzle in the engine. A portion of the body corresponding to the fuel inlet and/or the air inlet includes a recess for receiving a supply fitting having an annular sealing surface and a rotatable nut. The recess includes an annular seat sized and shaped for sealingly engaging the sealing surface of the supply tube fitting and female threads positioned adjacent the seat for threadably receiving the rotatable nut of the supply.

7 Claims, 2 Drawing Sheets

FUEL NOZZLE ASSEMBLY

This invention was made with government support under a grant from the U.S. Army (DAAE07-00-C-N086). The U.S. government has certain rights in this invention.

BACKGROUND OF THE INVENTION

The present invention relates generally to gas turbine engine fuel nozzles, and more particularly to a fitting for connecting a nozzle to a supply line.

Gas turbine engines generally have a compressor section for compressing flowpath air traveling through the engine, a combustor downstream from the compressor section for heating the compressed flowpath air, and a turbine section downstream from the combustor for removing energy from the heated flowpath air to drive the compressor section. The combustor includes fuel nozzles for delivering fuel to the combustor. The fuel nozzles have a fuel inlet that connects to a fuel supply line and an outlet that delivers the fuel to the combustor. Conventionally, the fuel nozzle inlet is formed as a protrusion having a rounded sealing surface and external threads. The fuel supply line has an annular conical seat that mates with the rounded sealing surface. An internally threaded nut is used to connect the fuel supply line to the inlet and hold the annular seat in sealing engagement with the rounded sealing surface.

In some applications, a frame surrounds the combustor immediately outside the fuel nozzles, and the fuel nozzles are cooled with cooling air. A separate cooling air supply line is provided for delivering the cooling air to passages extending through the nozzle. A protruding inlet similar to that used for the fuel supply line cannot be used to connect the cooling air supply line to the fuel nozzle because such an inlet configuration does not provide sufficient radial clearance between the fuel nozzles and the surrounding frame during assembly. Thus, there is a need for a fuel nozzle having a low profile cooling air inlet.

SUMMARY OF THE INVENTION

Briefly, the present invention includes a fuel nozzle assembly for delivering fuel to a combustor of a gas turbine engine. The assembly comprises a fuel nozzle including a body having a fuel inlet for receiving fuel from a fuel supply, an air inlet for receiving air from an air supply, an outlet for discharging fuel to the combustor of the gas turbine engine, and a mounting flange for mounting the nozzle in the engine so the fuel inlet and air inlet are positioned outside the combustor and the nozzle outlet is positioned inside the combustor. A portion of the body corresponding to at least one of the fuel inlet and the air inlet includes a recess for receiving a supply fitting having an annular sealing surface and a rotatable nut. The recess includes an annular seat sized and shaped for sealingly engaging the sealing surface of the supply tube fitting and female threads positioned adjacent the seat for threadably receiving the rotatable nut of the supply fitting to releasably fasten the supply tube to the fuel nozzle and hold the sealing surface of the supply tube in sealing engagement with the seat of the fuel nozzle.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
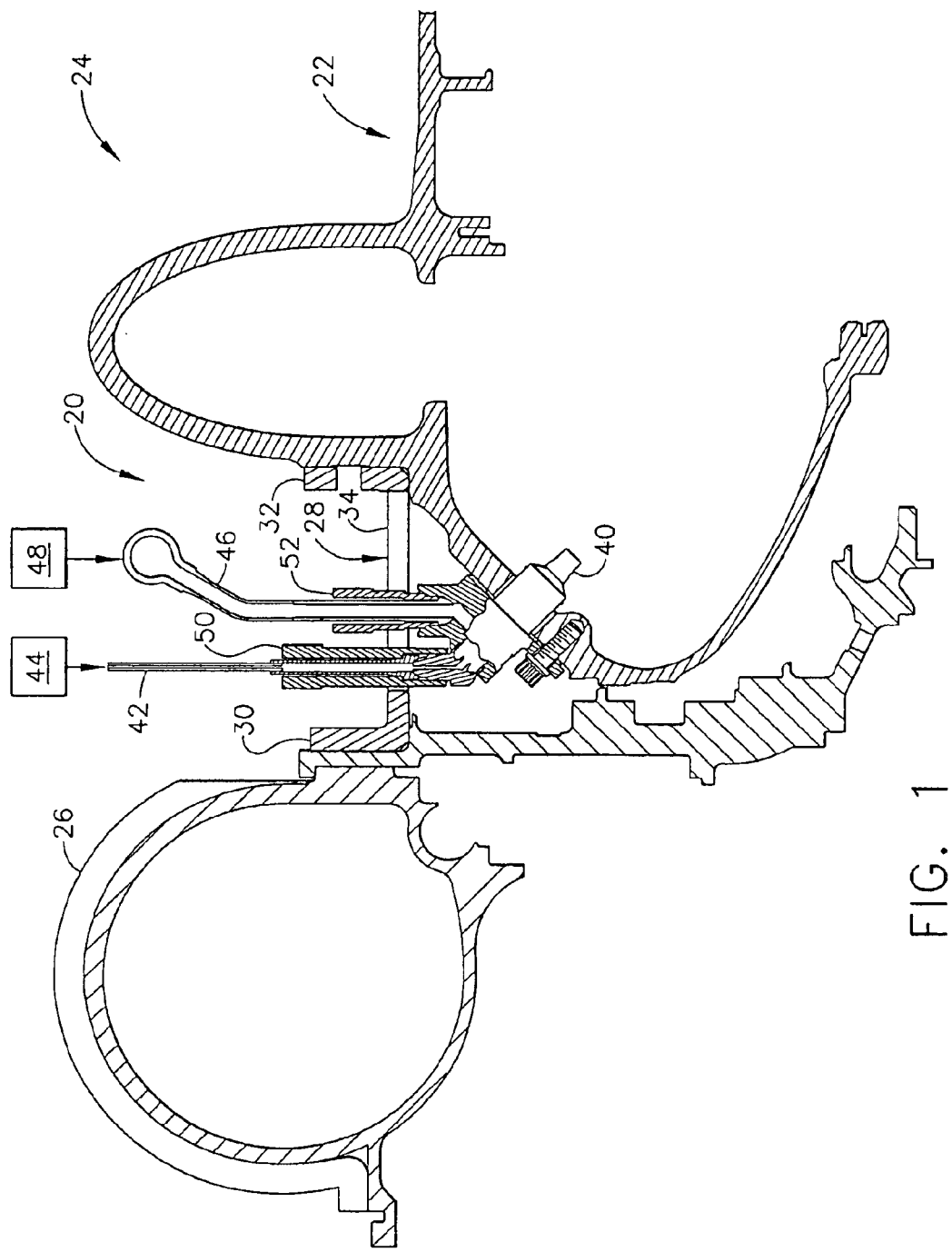
FIG. 1 is a partial cross section of a gas turbine engine having a fuel nozzle assembly of the present invention.

Referring now to the drawings and in particular to FIG. 1, a fuel nozzle assembly of the present invention is designated in its entirety by the reference numeral 20. The assembly 20 delivers fuel to a combustor, generally designated by 22, of a gas turbine engine, generally designated by 24 (partially shown). The fuel is ignited in the combustor 22 to heat flowpath air passing through the combustor. The combustor 22 is operatively positioned between a compressor 26 positioned upstream from the combustor for compressing the flowpath air before it enters the combustor and a turbine (not shown) positioned downstream from the combustor for driving the compressor. A frame, generally designated by 28, is mounted between the compressor 26 and the combustor 22. The frame 28 includes a forward flange 30 and an aft flange 32 spaced by a truss 34 allowing for movement between the compressor 26 and the combustor 22 as the engine heats up and cools down. The forward flange 30 and aft flange 32 are connected to the compressor 26 and the combustor, respectively, using conventional threaded fasteners (not shown).

Figure 2:
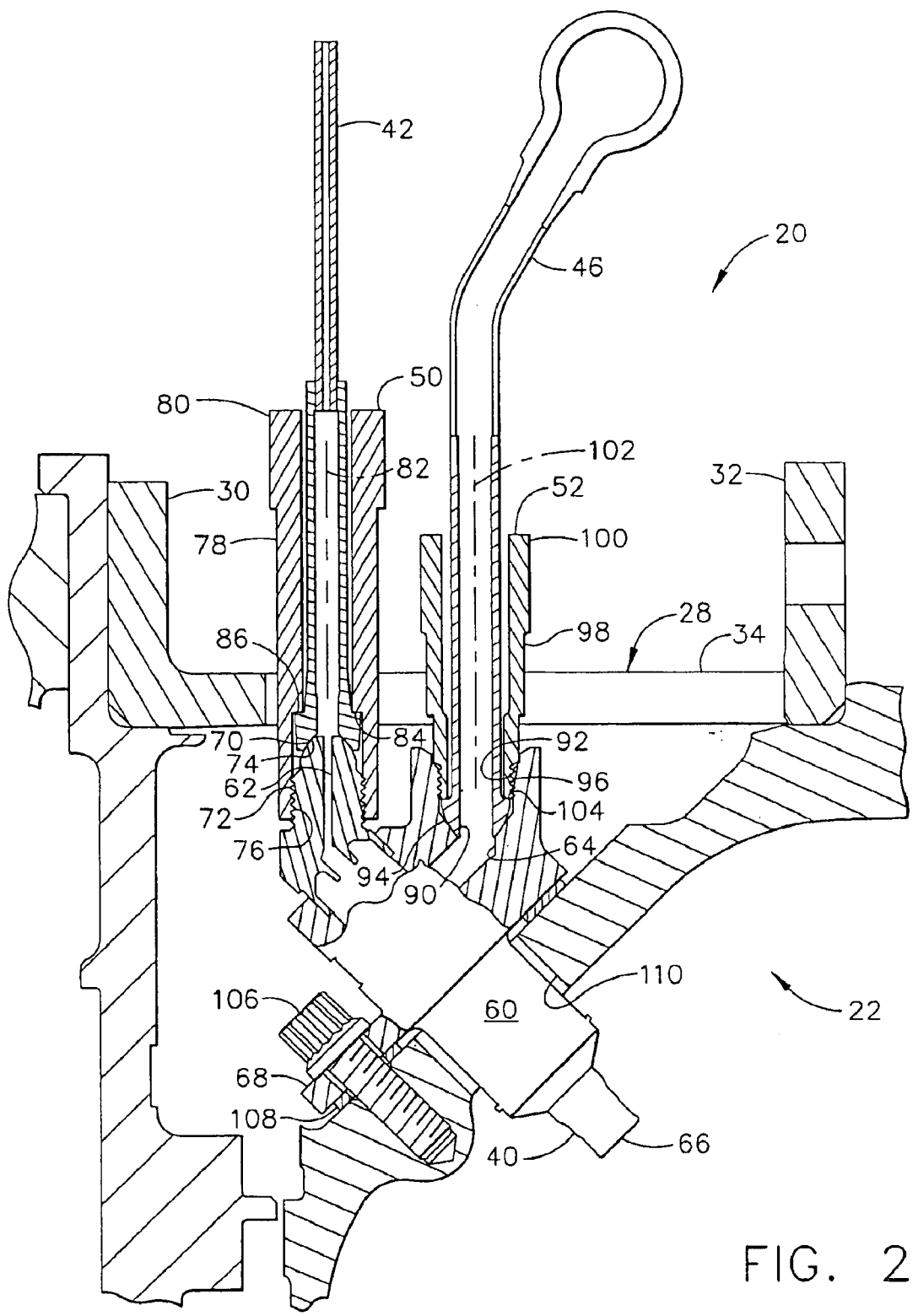
FIG. 2 is a detail of FIG. 1 showing the fuel nozzle assembly of the present invention.

The fuel nozzle assembly 20 comprises a fuel nozzle 40, a fuel supply line 42 for delivering fuel to the nozzle from a fuel supply 44, a cooling air supply line 46 for delivering cooling air to the nozzle from an air supply 48, and connectors 50, 52 for releasably connecting the fuel supply line and the cooling air supply line, respectively, to the nozzle. As illustrated n FIG. 2, the nozzle 40 includes a body 60 having a fuel inlet 62 for receiving fuel from the fuel supply line 42, a cooling air inlet 64 non-concentrically positioned with respect to the fuel inlet for receiving cooling air from the cooling air supply line 46, an outlet 66 for discharging fuel to the combustor 22 of the gas turbine engine 24, and a mounting flange 68 for mounting the nozzle on the combustor.

In one embodiment, the fuel inlet 62 includes a protrusion having a rounded sealing surface 70 and external threads 72 forming a fuel supply fitting. The fuel supply line 42 includes an annular conical seat 74 that sealingly engages the rounded sealing surface 70 of the body 60. As will be appreciated by those skilled in the art, the shapes of the sealing surface 70 and seat 74 may be modified without departing from the scope of the present invention. For example, the sealing surface 70 may have a conical shape corresponding to that of the seat 70. Although the annular seat 74 may have other included cone angles without departing from the scope of the present invention, in one embodiment the surface has an included cone angle or apex angle of about 74 degrees. In one embodiment, the fuel supply connector 50 is a nut having internal threads 76 for releasably connecting the fuel supply line 42 to the nozzle 40 so the rounded sealing surface 70 and the annular seat 74 are in sealing engagement. The connector 50 includes an elongate body 78 having a hexagonal wrenching surface 80 opposite the threads for turning the connector about a turning axis 82 to tighten and loosen the connector during assembly and disassembly. As will be appreciated by those skilled in the art, the wrenching surface 80 is sufficiently spaced from the threads 76 of the connector 50 so that the wrenching surface is positioned outside the truss 34 of the frame 28 when the connector is fully tightened. Thus, the elongate body 78 provides clearance for using a wrench to connect the fuel supply line 42 to the nozzle 40. The connector 50 and fuel supply line 42 have inter-engaging shoulders 84, 86, respectively, so the connector clamps the annular seat 74 of the fuel supply line 42 against the rounded sealing surface 70 of the body 60 as the connector is tightened. As will be appreciated by those skilled in the art, the resulting line contact between the annular seat 74 and the rounded sealing surface 70 provides a repeatable, fluid-tight seal at the interface.

Further, the cooling air inlet 64 includes a recess having an annular conical seat 90 and internal threads 92 forming a cooling air supply fitting. The cooling air supply line 46 includes a rounded sealing surface 94 that sealingly engages the annular seat 90 of the body 60. As will be appreciated by those skilled in the art, the shapes of the seat 90 and the sealing surface 94 may be modified without departing from the scope of the present invention. For example, the sealing surface 94 may have a conical shape corresponding to that of the seat 90. Although the annular seat 90 may have other included cone angles without departing from the scope of the present invention, in one embodiment the seat has an included cone angle or apex angle of about 74 degrees. In one embodiment, the cooling air supply connector 52 is a nut having external threads 96 for releasably connecting the cooling air supply line 46 to the nozzle 40 so the annular seat 90 and rounded sealing surface 94 are in sealing engagement. The connector 52 includes an elongate body 98 having a hexagonal wrenching surface 100 opposite the threads for turning the connector about a turning axis 102 to tighten and loosen the connector during assembly and disassembly. As will be appreciated by those skilled in the art, the wrenching surface 100 is sufficiently spaced from the threads 96 of the connector 52 so the wrenching surface is positioned outside the truss 34 of the frame 28 when the connector is fully tightened. Thus, the elongate body 98 provides clearance for using a wrench to connect the cooling air supply line 46 to the nozzle 40. The cooling air supply line 46 has a shoulder 104 that the connector 52 engages so the connector clamps the rounded sealing surface 94 of cooling air fuel supply line 46 against the annular seat 90 of the body 60 as the connector is tightened. As will be appreciated by those skilled in the art, the resulting line contact between the annular seat 90 and the rounded sealing surface 94 provides a repeatable, fluid-tight seal at the interface.

As will be apparent to those skilled in the art, the recessed configuration of the cooling air inlet 64 provides a lower profile than the protruding configuration of the fuel inlet 62. Thus, the fuel nozzle bodies 60 may be mounted on the combustor 22 before the combustor and frame 28 are assembled. Although the body may be mounted on the combustor 22 in other ways with departing from the scope of the present invention, in one embodiment, the mounting flange 68 is fastened to the combustor with a screw fastener 106. A seal 108 is provided between the flange 68 and the combustor 22 to seal the interface between the flange and the combustor. The nozzle body 60 extends through a hole 110 in the combustor 22 so that the nozzle outlet 66 is positioned inside the combustor and the fuel inlet 62 and cooling air inlet 64 are positioned outside the combustor when the flange is fastened to the combustor.

The shorter profile of the cooling air inlet 64 permits the mounted nozzle bodies 60 to slide inside the frame 28 during assembly without interfering with the frame. Once the combustor 22 and frame 28 are assembled. The fuel supply line 42 and cooling air supply line 46 may be connected to the fuel inlet 62 and cooling air inlet 64, respectively, and the connectors 50, 52 may be tightened to seal the respective sealing surfaces.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A fuel nozzle assembly for delivering fuel to a combustor of a gas turbine engine, said assembly comprising a fuel nozzle including a body having a fuel inlet for receiving fuel from a fuel supply, an air inlet for receiving air from an air supply, an outlet for discharging fuel to the combustor of the gas turbine engine, and a mounting flange for mounting the nozzle in the engine so the fuel inlet and air inlet are positioned outside the combustor and the nozzle outlet is positioned inside the combustor, wherein a portion of the body corresponding to at least one of said fuel inlet and said air inlet includes a recess for receiving a supply fitting having an annular sealing surface and a rotatable nut, the recess including an annular seat sized and shaped for sealingly engaging the sealing surface of the supply fitting and female threads positioned adjacent the seat for threadably receiving the rotatable nut of the supply fitting to releasably fasten the supply fitting to the fuel nozzle and hold the sealing surface of the supply fitting sealing engagement with the seat of the fuel nozzle, said annular seat including a conical surface having an apex angle of about 74 degrees.

2. In combination, a fuel nozzle assembly for delivering fuel to p combustor of a gas turbine engine and a supply fitting, said fitting including a sealing surface at least a portion of which is rounded, said assembly comprising a fuel nozzle including a body having a fuel inlet for receiving fuel from a fuel supply, an air inlet for receiving air from an air supply, an outlet for discharging fuel to the combustor of the gas turbine engine, and a mounting flange for mounting the nozzle in the engine so the fuel inlet and air inlet are positioned outside the combustor and the nozzle outlet is positioned inside the combustor, wherein a portion of the body corresponding to at least one of said fuel inlet and said air inlet includes a recess for receiving the supply fitting having an annular sealing surface and a rotatable nut including external threads and a wrenching surface for turning the nut about a turning axis relative to the recess, the recess including an annular seat sized and shaped for sealingly engaging the sealing surface of the supply fitting and female threads positioned adjacent the seat for threadably receiving the rotatable nut of the supply fitting to releasably fasten the supply fitting to the fuel nozzle and hold the sealing surface of the supply fitting in sealing engagement with the seat of the fuel nozzle, and wherein the external threads and wrenching surface are sufficiently axially spaced so that the wrenching surface is positionable outside a combustor frame when the external threads are positioned inside the combustor frame.

3. A combination as set forth in claim 2 wherein the sealing surface of the supply fitting includes a rounded surface.

4. A fuel nozzle assembly for delivering fuel to a combustor of a gas turbine engine, said assembly comprising a fuel nozzle including a body having a fuel inlet for receiving fuel from a fuel supply, an air inlet for receiving air from an air supply, an outlet for discharging fuel to the combustor of the gas turbine engine, and a mounting flange for mounting the nozzle in the engine so the fuel inlet arid air inlet are positioned outside the combustor and the nozzle outlet is positioned inside the combustor, wherein a portion of the body corresponding to at least one of said fuel inlet and said air inlet includes a recess for receiving a supply fitting having an annular sealing surface and a rotatable nut, the recess including an annular seat sized and shaped for sealingly engaging the sealing surface of the supply fitting and female threads positioned adjacent the seat for threadably receiving the rotatable nut of the supply fitting to releasably fasten the supply fitting to the fuel nozzle and hold the sealing surface of the supply fitting in sealing engagement with the seat of the fuel nozzle, wherein the fuel inlet and the air inlet are non-concentric, and wherein a portion of the body corresponding to another of said fuel inlet and said air inlet includes a protrusion having external threads and an annular seal positioned concentric with the protrusion threads.

5. A fuel nozzle assembly for delivering fuel to a combustor of a gas turbine engine, said assembly comprising a fuel nozzle including a body having a fuel inlet for receiving fuel from a fuel supply, an air inlet for receiving air from an air supply, an outlet for discharging fuel to the combustor of the gas turbine engine, and a mounting flange for mounting the nozzle in the engine so the fuel inlet and air inlet are positioned outside the combustor and the nozzle outlet is positioned inside the combustor, wherein a portion of the body corresponding to at least one of said fuel inlet and said air inlet includes a recess for receiving a supply fitting having an annular sealing surface and a rotatable nut, the recess including an annular seat sized and shaped sealingly engaging the sealing surface of the supply fitting and female threads positioned adjacent the seat for threadably receiving the rotatable nut of the supply fitting to releasably fasten the supply fitting to the fuel nozzle and hold the sealing surface of the supply fitting in sealing engagement with the seat of the fuel nozzle, and wherein the portion of the body including the recess corresponds to said air inlet.

6. A gas turbine engine fuel nozzle assembly for delivering fuel to a gas turbine engine combustor comprising:
  a body having:
    a fuel inlet for receiving fuel from a fuel supply line,
    an air inlet for receiving air from an air supply line,
    an outlet for discharging fuel to the combustor of the gas turbine engine,
    an externally threaded protrusion adjacent one of the fuel inlet and the air inlet for engaging an internally threaded fitting to connect the corresponding supply line to the body, and
    an internally threaded recess adjacent another of the fuel inlet and the air inlet for engaging an externally threaded fitting to connect the corresponding supply line to the body.

7. A gas turbine engine fuel nozzle assembly for delivering fuel to a gas turbine engine combustor comprising:
  a fuel supply line for delivering fuel from a fuel source;
  an air supply line for delivering air from an air source;
  an externally threaded nut rotatably connected to one of said fuel supply line and said air supply line;
  an internally threaded nut rotatably connected to another of said fuel supply line and said air supply line; and
  a fuel nozzle body having:
    a fuel inlet for receiving fuel from the fuel supply line,
    an air inlet for receiving air from the air supply line,
    an outlet for discharging fuel to the combustor of the gas turbine engine,
    an externally threaded protrusion adjacent one of the fuel inlet and the air inlet for engaging the internally threaded nut to connect the corresponding supply line to the body, and
    an internally threaded recess adjacent another of the fuel inlet and the air inlet for engaging the externally threaded fitting to connect the corresponding supply line to the body.

* * * * *